(12) United States Patent
Slotte et al.

(10) Patent No.: US 9,800,969 B2
(45) Date of Patent: *Oct. 24, 2017

(54) SPEAKER BACK CAVITY

(71) Applicant: Nokia Corporation, Espoo (FI)

(72) Inventors: Thomas Benedict Slotte, Turku (FI); Anders Johan Engberg, Billnas (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/077,073

(22) Filed: Mar. 22, 2016

(65) Prior Publication Data
US 2016/0205465 A1   Jul. 14, 2016

Related U.S. Application Data

(63) Continuation of application No. 14/059,975, filed on Oct. 22, 2013, now Pat. No. 9,386,134.

(51) Int. Cl.
| | |
|---|---|
| *H04R 1/20* | (2006.01) |
| *H04R 1/28* | (2006.01) |
| *H04M 1/03* | (2006.01) |
| *H04M 1/60* | (2006.01) |

(52) U.S. Cl.
CPC .......... *H04R 1/2819* (2013.01); *H04M 1/035* (2013.01); *H04R 1/2849* (2013.01); *H04M 1/6041* (2013.01); *H04R 2499/11* (2013.01)

(58) Field of Classification Search
CPC . H04R 1/34; H04R 1/345; H04R 1/20; H04R 1/24; H04R 2201/028; H04R 2201/029; H04R 2499/11; H04R 2499/15; H04M 1/04; H04M 1/035; H04M 1/03

USPC .......... 381/150, 337, 345, 349, 351
See application file for complete search history.

(56) References Cited

U.S. PATENT DOCUMENTS

| | | | |
|---|---|---|---|
| 5,850,460 A | 12/1998 | Tanaka et al. | |
| 7,142,686 B2 | 11/2006 | Furuya et al. | |
| 7,280,666 B2 | 10/2007 | Guyot et al. | |
| 7,409,058 B2 * | 8/2008 | Holmes ................. | H04M 1/035 379/428.01 |

(Continued)

FOREIGN PATENT DOCUMENTS

| | | |
|---|---|---|
| CN | 202979074 U | 6/2013 |
| EP | 1389032 A2 | 2/2004 |
| JP | 2013120958 A | 6/2013 |

OTHER PUBLICATIONS

Yasuharu Onishi, Jun Kuroda, Yukio Murata, Motoyoshi Komoda, Kazuyuki Tsunoda, Yukio Yokoyama, Yasuhiro Oikawa, Yoshio Yamasaki "*The Acoustical Design of Mobile Phones*" Proceedings of 20th International Congress on Acoustics, ICA 2010. Aug. 23-27 2010, Sydney Australia.

*Primary Examiner* — MD S Elahee
*Assistant Examiner* — Sabrina Diaz
(74) *Attorney, Agent, or Firm* — Harrington & Smith

(57) ABSTRACT

An apparatus including a sound transducer; and a housing having the sound transducer connected thereto. The housing forms a substantially sealed air space back cavity acoustically coupled to the sound transducer. The housing includes a housing member having a first dividing structure located in the back cavity to connect two adjacent air mass sections of the back cavity, where the dividing structure includes at least one aperture to permit travel of sound waves through the at least one aperture between the air mass sections.

28 Claims, 8 Drawing Sheets

(56) References Cited

U.S. PATENT DOCUMENTS

| | | |
|---|---|---|
| 7,508,933 B2 | 3/2009 | Yang et al. |
| 7,578,368 B2 | 8/2009 | Yang et al. |
| 7,876,922 B2 | 1/2011 | Park et al. |
| 8,259,985 B2 | 9/2012 | Yang et al. |
| 8,724,838 B2 | 5/2014 | Jiang et al. |
| 2004/0142731 A1 | 7/2004 | Ho et al. |
| 2008/0130931 A1 | 6/2008 | Hampton |
| 2008/0219490 A1 | 9/2008 | Yang et al. .................... 381/351 |
| 2010/0172530 A1* | 7/2010 | Horowitz ............... H04R 1/345 381/345 |
| 2010/0331058 A1* | 12/2010 | Qingshan ............. H04M 1/035 455/575.1 |

* cited by examiner

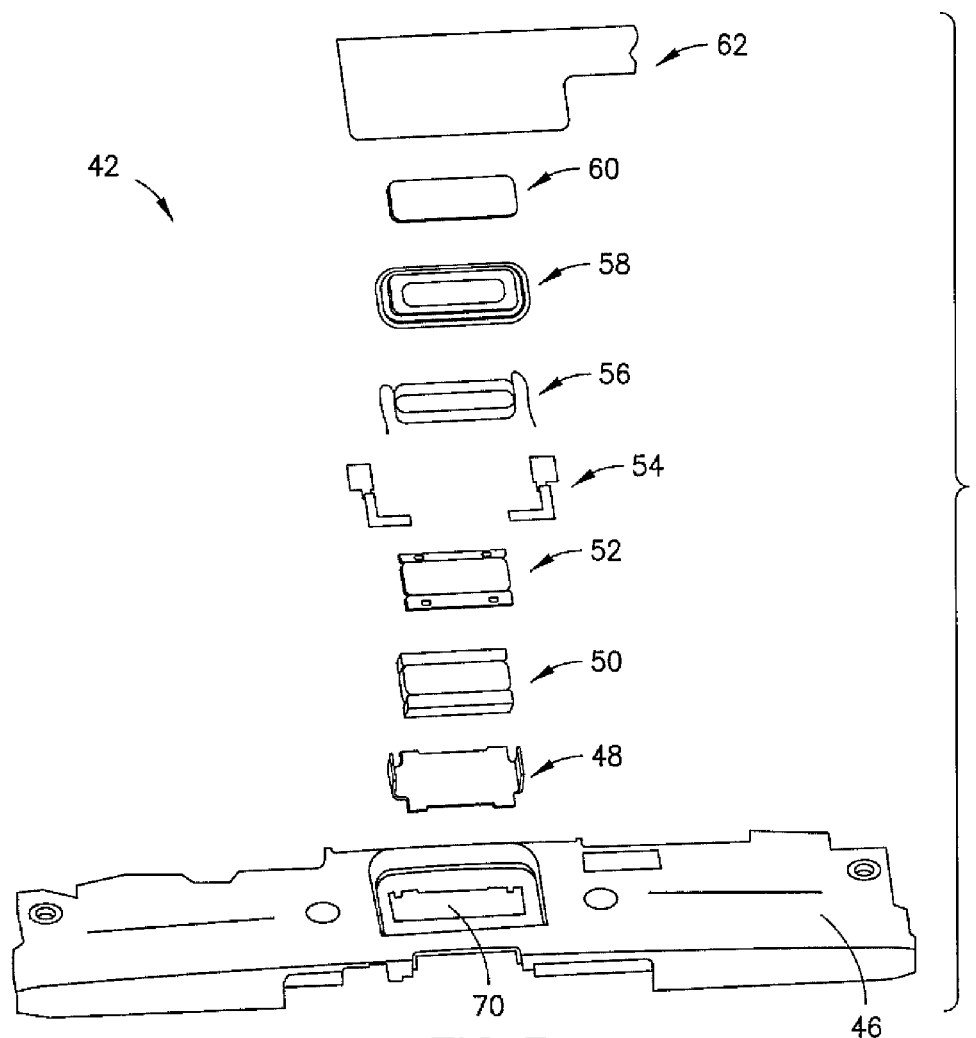
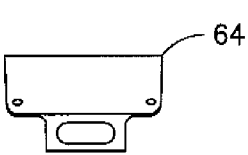
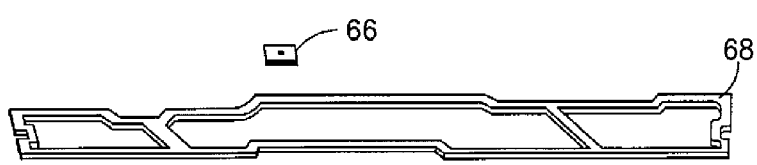
FIG.3
FIG.4
FIG.5

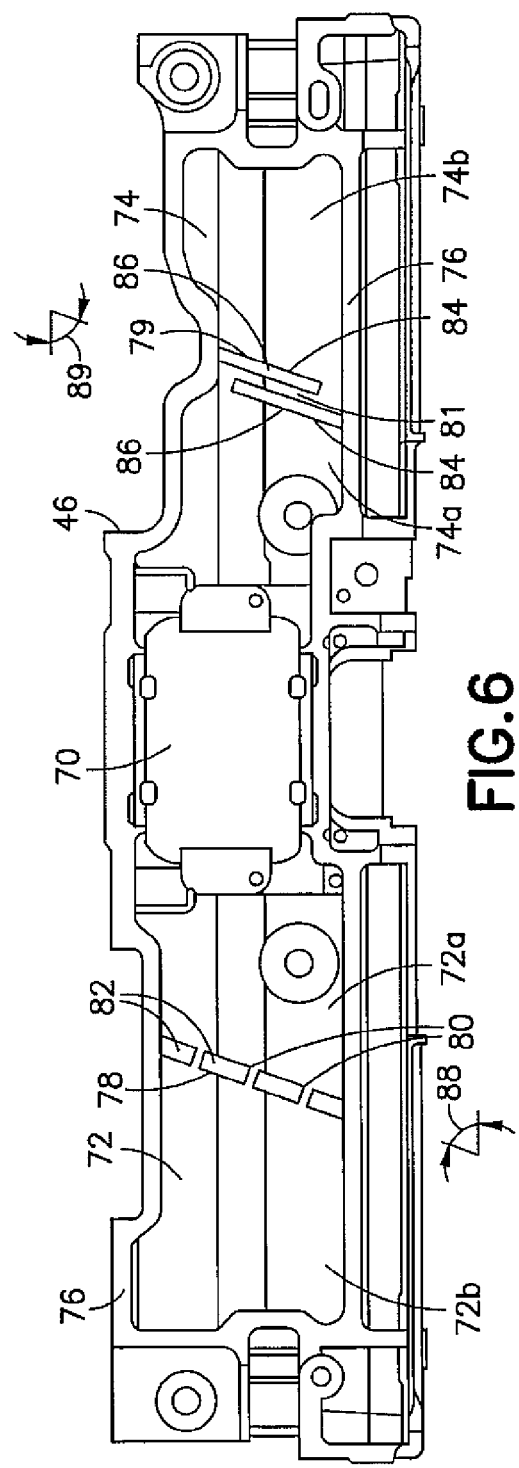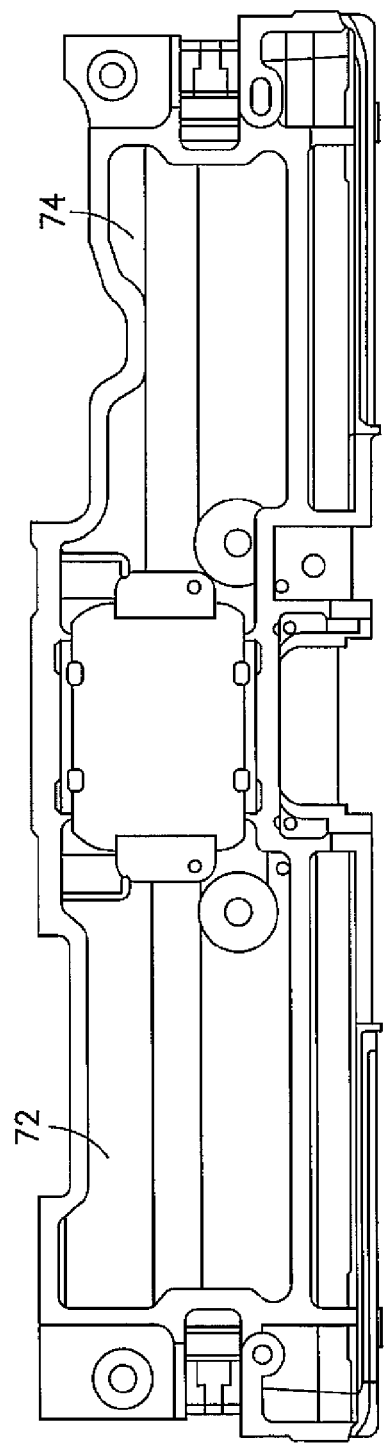

SPEAKER BACK CAVITY

CROSS REFERENCE TO RELATED APPLICATION

This application is a continuation of copending application Ser. No. 14/059,975 filed Oct. 22, 2013 which is hereby incorporated by reference in its entirety.

BACKGROUND

Technical Field

The exemplary and non-limiting embodiments relate generally to a sound transducer and, more particularly, to a back cavity for a sound transducer.

Brief Description of Prior Developments

A speaker in a portable electronic device, such as a mobile phone for example, often has a back cavity for acoustic purposes.

SUMMARY

The following summary is merely intended to be exemplary. The summary is not intended to limit the scope of the claims.

In accordance with one aspect, an example embodiment is provided in an apparatus including a sound transducer; and a housing having the sound transducer connected thereto. The housing forms a substantially sealed air space back cavity acoustically coupled to the sound transducer. The housing includes a housing member having a first dividing structure located in the back cavity to connect two adjacent air mass sections of the back cavity, where the dividing structure includes at least one aperture to permit travel of sound waves through the at least one aperture between the air mass sections.

In accordance with another aspect, an example method comprises providing a sound transducer; connecting a housing member to the sound transducer, where the housing member comprises a wall establishing a perimeter of a back cavity area for the sound transducer, where the wall forms the back cavity area on a single first side of the housing member, where the housing member comprises a first dividing structure located in the back cavity area connecting two adjacent air mass sections of the back cavity area; and connecting the first side of the housing member to at least one second member to substantially close the back cavity area, where the wall and the first dividing structure attach to the at least one second member to form a substantially sealed air space back cavity acoustically coupled to the sound transducer.

BRIEF DESCRIPTION OF THE DRAWINGS

The foregoing aspects and other features are explained in the following description, taken in connection with the accompanying drawings, wherein:

FIG. 3 is an exploded perspective view of components of the speaker and its housing member shown in FIG. 2;

FIG. 4 is a perspective view of an alternate embodiment of one of the components shown in FIG. 3;

FIG. 5 is a perspective view of other possible components of the apparatus shown in FIGS. 1-3;

FIG. 6 is a bottom plan view of the housing member shown in FIG. 3;

FIG. 7 is a bottom plan view of the housing member shown in FIG. 6, but without the dividing structures;

DETAILED DESCRIPTION OF EMBODIMENTS

Figure 1:
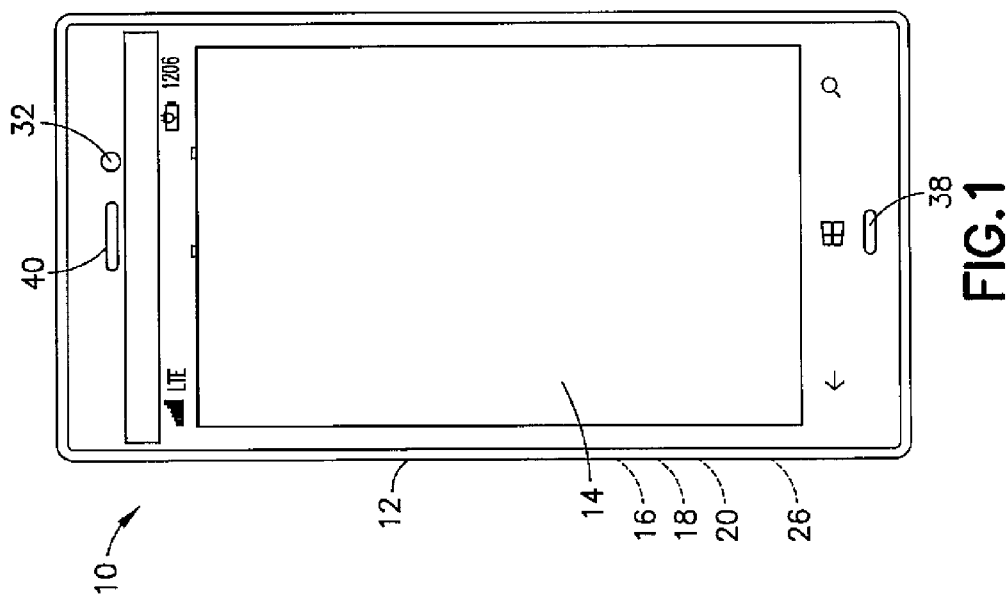
FIG. 1 is a front view of an example embodiment of an apparatus comprising features as described herein.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be a hand-held portable apparatus, such as a communications device which includes a telephone application for example. In the example shown the apparatus 10 is a smartphone which includes a camera and a camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone.

Figure 2:
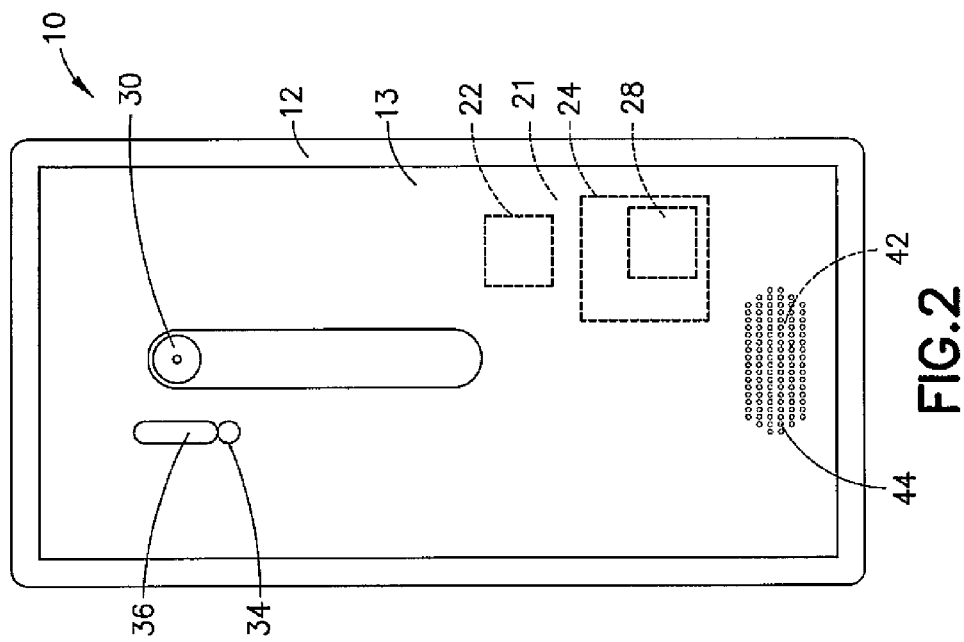
FIG. 2 is a rear view of the apparatus shown in FIG. 1.

Referring also to FIG. 2, the apparatus 10, in this example embodiment, comprises a housing 12, a touchscreen 14, a receiver 16, a transmitter 18, a controller 20, a rechargeable battery 26 and a camera 30. However, all of these features are not necessary to implement the features described below. The controller 20 may include at least one processor 22, at least one memory 24, and software 28. The electronic circuitry inside the housing 12 may comprise at least one printed wiring board (PWB) 21 having components such as the controller 20 thereon. The receiver 16 and transmitter 18 form a primary communications system to allow the apparatus 10 to communicate with a wireless telephone system, such as a mobile telephone base station for example.

In this example, the apparatus 10 includes the camera 30 which is located at the rear side 13 of the apparatus, a front camera 32, an LED 34, and a flash system 36. The LED 34 and the flash system 36 are also visible at the rear side of the apparatus, and are provided for the camera 30. The cameras 30, 32, the LED 34 and the flash system 36 are connected to the controller 20 such that the controller 20 may control their operation. In an alternate example embodiment the rear side may comprise more than one camera, and/or the front side could comprise more than one camera. The apparatus 10 includes a sound transducer provided as a microphone 38. In an alternate example the apparatus may comprise more than one microphone. The apparatus 10 includes a sound transducer provided as an earpiece 40, and a sound transducer provided as a speaker 42. More or less than one speaker may be provided.

Features as described herein relate to audio reproduction, such as in a mobile communication device for example. More specifically, features may relate to an enclosure for an integrated hands-free (IHF) loudspeaker, such as the speaker 42 for example. Such a loudspeaker most commonly has one side enclosed in a sealed air space, hereafter known as the back cavity, while the other side of the loudspeaker is coupled to a sound outlet in the outer cover of the mobile communication device. In the embodiment shown in FIG. 2, the back cover 13 comprises sound holes 44 for the speaker 42. However, in alternate embodiments the sound holes and speaker could be located at any suitable location on the apparatus.

Mobile devices usually have severely constrained spaces inside them. In spite of this, a back cavity must be arranged for the IHF loudspeaker. This means that the back cavity often has to have an elongated shape. For good audio performance, the opposite (i.e. a compact shape without elongated parts) is better. Elongated shapes of such cavities usually cause artifacts such as higher modes that result in peaks and dips in the frequency response of the IHF. Pronounced peaks and dips are problematic not only because they reduce sound quality, but also because they may keep the IHF from passing audio reproduction requirements, and furthermore because they may lead to physical failure of the speaker. Physical failure can happen such as if a mode happens to coincide with a vibration mode in the lead wires of the loudspeaker for example. Even if the frequency response of an IHF does fit inside given specification limits, high peaks and dips are undesirable as they leave less margin for inevitable variation in performance due to tolerances.

Referring also to FIG. 3, in this example the speaker 42 is provided in the form with a speaker box. In particular, for this example the speaker 42 comprises a housing component 46, a yoke 48, a magnet 50, a plate 52, metal inserts 54, a electromagnetic coil 56, a membrane 58, a done 60 and a liner or protective film 62. This is merely an example of some of the components. In alternate embodiments other types of components may be used. For example, FIG. 4 shows a front gasket 64 rather than use of the protective film 62. FIG. 5 also shows a microphone seal 66 and a printed circuit board (PCB) gasket 68 which could be used with the housing component 46. The housing component 46, such as made of molded plastic for example, is configured to have the other components attached thereto, such as including the printed circuit board 21 for example, to close the back cavity of the speaker box.

In this example the housing component 46 helps to form a speaker box which is located inside the housing 12. In an alternate example a same or similar cavity structure provided by the speaker box may be designed inside an electronic device where the electronic device also comprises a speaker transducer so that such cavity structure can be acoustically coupled to the speaker transducer. In this regard the apparatus could be a standalone speaker box, so that it could be placed inside the electronic device, or alternatively the apparatus may have such a cavity arrangement created inside the electronic device without accommodating any removable/attachable speaker box. Basically the housing could be a speaker box, but such air space could be formed by different sections of the electronic device. Therefore, the housing 12 of the electronic apparatus 10 could form such cavity; entirely or at least partially.

Figure 6A:
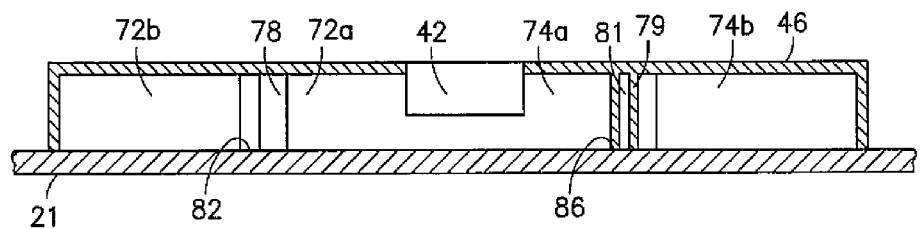
FIG. 6A is a schematic cross section view of the speaker and housing member shown in FIGS. 3 and 6 attached to a printed circuit board of the apparatus shown in FIGS. 1-2.

Referring also to FIG. 6, the opposite side of the housing component 46 is shown. The housing component 46 has a receiving area 70 which is configured to receive the components 48-60. The housing component 46 is a one-piece member having integrally formed cavities 72, 74 which, along with an area directly under the transducer, form the back cavity for the speaker. In this example the two cavities 72, 74 are separated by the area directly under the sound transducer. The upstanding ribs or walls 76 surrounding the cavities 72, 74 are attached to another component, such as the PCB 21 as shown in FIG. 6A for example, to close the cavities 72, 74. Thus, the PCB may function as a housing member to form the back cavity with the housing component 46. In an alternate example, another member(s) could be used with the housing member 46 to close the back cavity, or the housing member could provide the closed back cavity itself as a one piece member. The components 48-62 close off the aperture into the receiving area 70. Thus, the cavities 72, 74 form a sealed air space to function as the back cavity for the speaker.

Features as described herein comprise providing one or more dividing structures (walls) 78, 79 having one or more apertures 80, 81 in the cavities 72, 74. For illustration purposes only, FIG. 7 shows the housing member 46 without the dividing structures 78, 79. As can be seen, the cavities 72, 74 for the back cavity have a relatively simple generally block shape. For audio performance, the back cavity formed by the relatively simple, block shaped cavities 72, 74 provides a concentrated area, but would still be elongated enough to cause higher modes. Thus, the dividing structures are added to thereby provide a compact shape without elongated parts to provide better audio performance than a back cavity having an elongated shape.

In this example embodiment, the first dividing structure 78 is a straight wall with a plurality of the apertures 80 therethrough. The first dividing structure 78 in the first cavity 72, because of the apertures 80, has a general grid or lattice shape. The ends or surfaces 82 of the dividing structure 78 are at the same plane as the ends of the walls 76. Thus, the surfaces 82 may be sealed onto the PCB with the walls 76. This is illustrated by FIG. 6A. In an alternate example, a little gap may be provided between 82 and the PCB in order to cause a small leak; which usually has the effect of providing some acoustic damping. Pressure waves must travel through the apertures 80 in order to travel between the two cavity sections 72a, 72b of the cavity 72. The cavity sections 72a, 72b form two adjacent air mass holding sections of the back cavity. The size, location and shape of the apertures 80 may be selected so as to provide a tuning function, so as to attenuate and/or shift the modes to have a less detrimental effect on the frequency response, sound quality and loudspeaker lifetime.

In this example embodiment, the second dividing structure 79 has two straight walls 84 forming a conduit therebetween by the aperture 81. The conduit may be considered a tuned pipe, or port or channel. The ends or surfaces 86 of the dividing structure 79 are at the same plane as the ends of the walls 76. Thus, the surfaces 86 may be sealed onto the PCB with the walls 76. In the alternate example where a small gap is provided between the ends 86 and the PCB, the cavity sections 74a, 74b are still at the same plane as the ends of the walls 76. Pressure waves must travel through the aperture 81 in order to travel between the two cavity sections 74a, 74b of the cavity 74. The two cavity sections 74a, 74b form two adjacent air mass holding sections of the back cavity. The size, location and shape of the aperture 81 may be selected so as to provide a tuning function, so as to attenuate and/or shift the modes to have a less detrimental effect on the frequency response, sound quality and loudspeaker lifetime.

In one example embodiment, the length of each half 72, 74 of the back cavity is about 24 mm, and has a width of about 9 mm. Thus, the ratio of length to width is about 2.67:1 or about 37.5%. In other examples, in order to provide the non-elongate, generally block shaped back cavity without elongated parts, the ratio may be about 4:1, or 3:1, or less. The height in this example is about 2.5 mm. The dimensions may vary along the length of the cavity. The first divider 78 has three slots 80, each may have the same height as the cavity (perhaps with a slight gap for dampening as mentioned above), with a width of about 0.6 mm, and a length (in air flow direction) of about 0.9 mm. The second divider 79 is, in effect, a rectangular tube having again the same height as the cavity, a width of about 0.8 mm, and a physical length of about 4.5 mm (the effective acoustical length is perhaps 8 mm, because of the walls close to the ends of the tube). In this example embodiment the total acoustic volumes for the respective cavities are:

Cavity 72 having 3 slots=about 0.55 $cm^3$,
Cavity 74 having tube=about 0.43 $cm^3$.

The size of the section 72a relative to the size of the section 72b is about 50 percent or smaller, but it may be greater. The size of the section 74a relative to the size of the section 74b is about 50 percent or smaller, but it may be greater. Please note that the specific specification numbers and dimensions given above these are merely for an example, and should not be considered as limiting. The slots and wall locations could also be different as long as they still work for the given case. The sections 72a, 72b and 74a, 74b are all located in a same plane, side-by-side, and not stacked one on top of the other. In an alternate example the tube may also be shorter than the cavity in order to provide a small gap for damping.

There is no principal difference between how a series of slots, or a single tube, work. Both produce an additional acoustic mass at the given location, and it may be tuned according to the cavity shape and volume. One must also consider what dimensions are achievable by molding plastic. The angles 88, 89 of the dividing structures may be varied (or other shapes provided) to tune the reflections and pressure flows. The angle typically has only a negligible or non-existent effect on reflections; when dimensions are as small as here. However, the structures may be angled such as to merely avoid injection gates in the mold chamber, and components on the PWB for example. A tuned pipe effect is provided by the addition of the dividing structures, as a tuned expansion chamber, while still keeping the general block shape of the back chamber shown in FIG. 6.

There are many possible ways to tune the dividing structures. In one example, a wall and aperture may be provided just to slightly shift a mode (from the loudspeaker's point of view) to a less risky frequency, to avoid failures of, for example, lead wires. In another example, a wall and aperture may be tuned to act as an acoustic low-pass filter that decouples an outer part of the cavity from an inner part of the cavity adjacent to the loudspeaker 42, above a given frequency, as a means of avoiding one or more higher modes. In yet another example, the end result may just be several weaker modes instead of one or a couple of strong modes, to help to flatten the frequency response and/or fit it inside given specification limits.

If the back cavity consists of two or more separate parts (branches), such as 72 and 74 for example, each of them may have its own dividing structure(s), or there may be two or more dividing structures in series; one after the other for example.

The angles 88, 89 of the dividing structures and location of dividing structures might not be determined purely by acoustics, but may also have to be adjusted such as according to locations of other intervening components inside the back cavity and/or injection gates in the mold for example. In the example embodiment shown in FIG. 6, the right side dividing structure 79 effectively consists of a tube (in order to produce a higher acoustic mass) whereas the left side dividing structure 78 instead has three slits (producing a lower acoustic mass and somewhat higher acoustic resistance in this case, with these dimensions).

Figure 8:
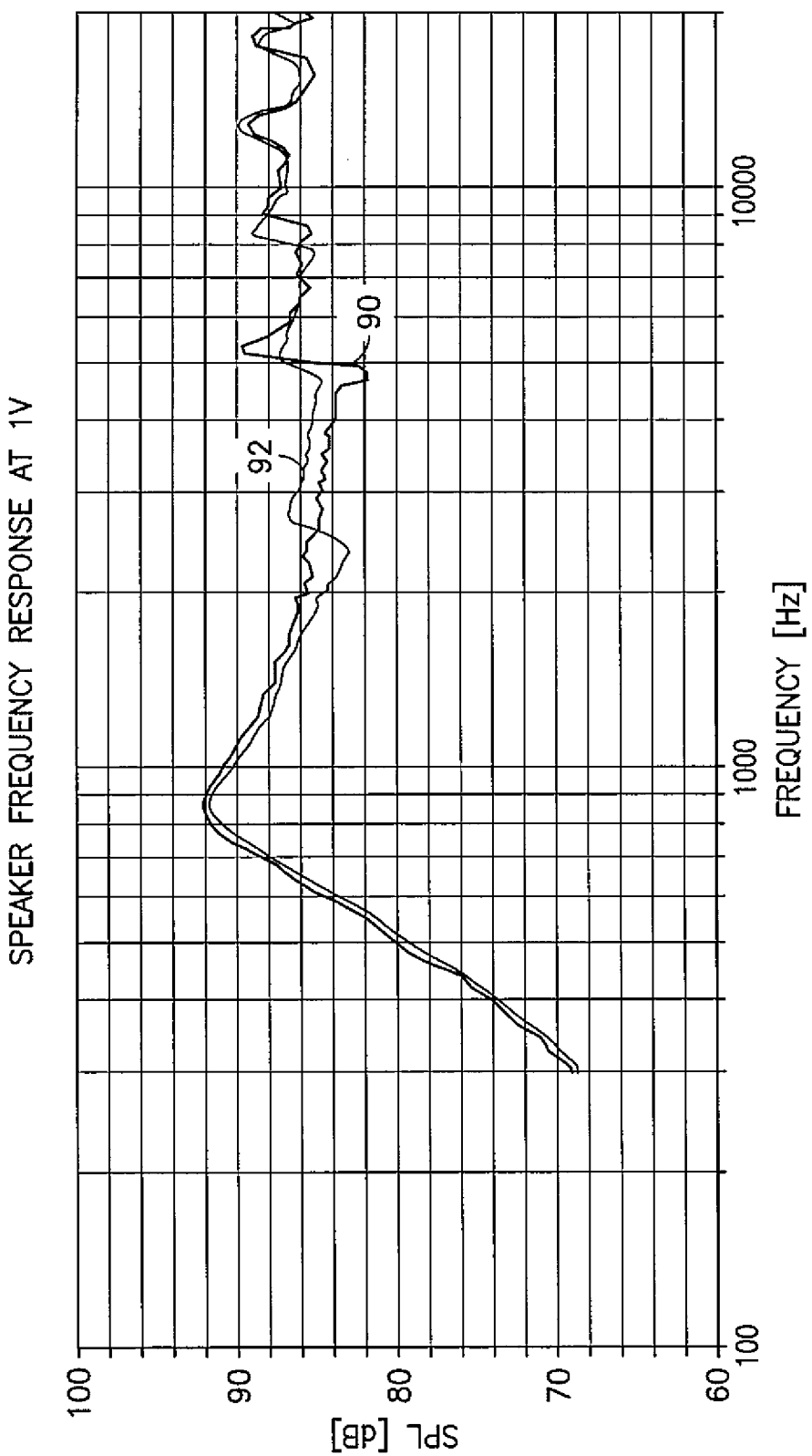
FIG. 8 is a graph of speaker frequency response at 1 Volt for use with the housing member shown in FIG. 6 versus the housing member shown in FIG. 7.

Referring also to FIG. 8, the graph shows an example of a measured effect of having the above-mentioned dividing structures in the back cavity. Speaker frequency response at 1 V is shown. Line 90 shows the response for the back cavity shown in FIG. 7 which does not have the dividing structures. Line 92 shows the improved performance with the dividing structures 78, 79 in place in accordance with the example shown in FIG. 6. The smaller difference between minimum and maximum sound pressure levels for the line 92 versus line 90, especially in the 4-6 kHz range, should be noted.

To this implementation, further damping elements may or may not be added. For example, one or more dividing structures may be deliberately made slightly shorter than the surrounding walls in order to produce a small leakage acting as an additional acoustic resistance, or additional damping foam may be added to one or more dividing structures.

Figure 9:
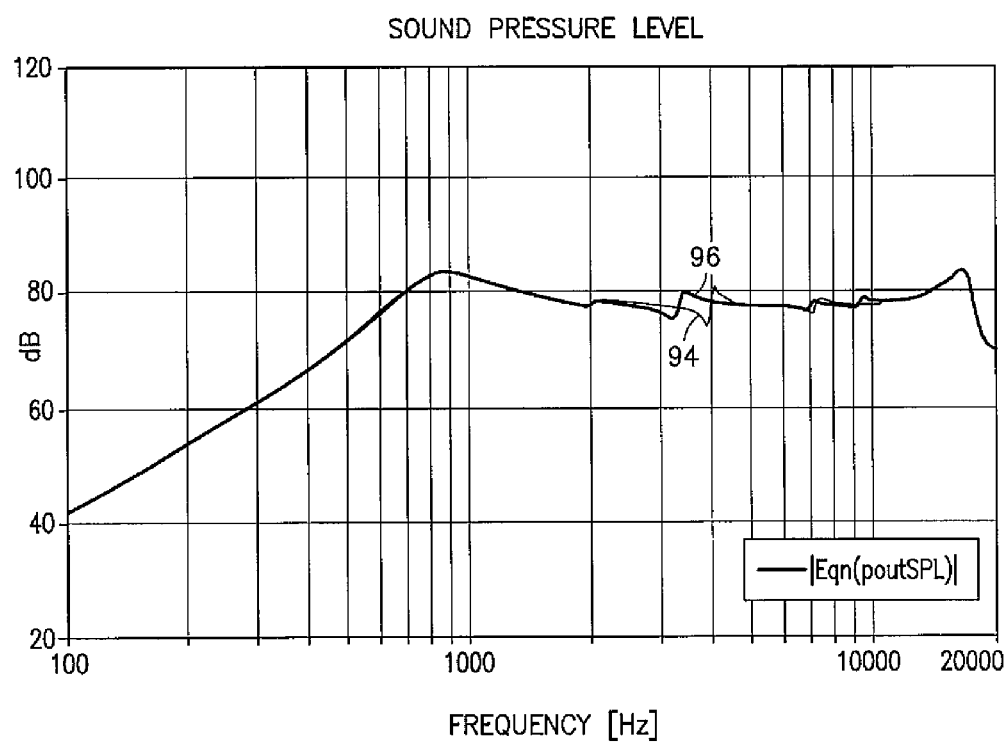
FIG. 9 is a graph of simulated speaker frequency response at 700 mV for use with the housing member shown in FIG. 6 versus a housing member similar to that shown in FIG. 6 but having only one dividing structure rather than two dividing structures.
Figure 10:
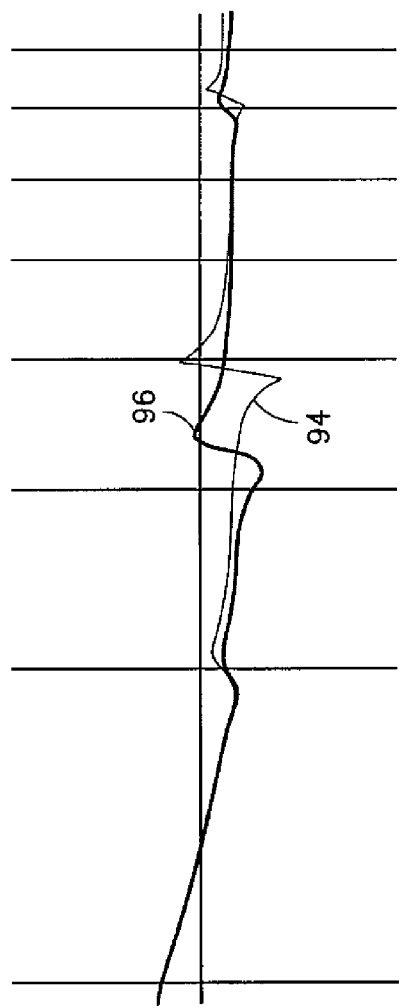
FIG. 10 is an enlarged view of a portion of the graph shown in FIG. 9.
Figure 11:
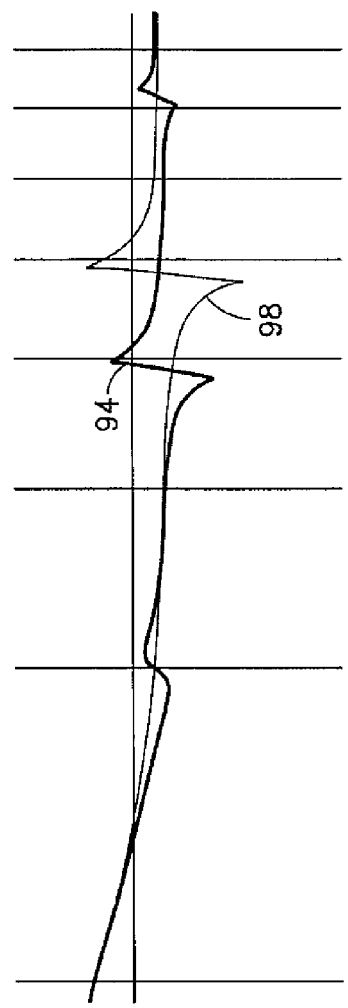
FIG. 11 is a view as in FIG. 10 of simulated speaker frequency response at 700 mV with use of the housing member shown in FIG. 7 versus a housing member at in FIG. 6 but having only one dividing structure.

An embodiment may have merely one dividing structure, two dividing structures, or more than two dividing structures. Referring also to FIG. 9, frequency responses obtained from simulations for the back cavity of FIG. 6 (having two dividing structures) versus a back cavity having only one dividing structure is shown. Line 94 represents when one divider is used, and line 96 represents when two dividers are used. FIG. 10 shows an enlarged view of the lines 94, 96 between 1000-8000 Hz. Referring also to FIG. 11, frequency responses obtained from simulations for the back cavity having only one dividing structure is shown by line 94, and line 98 represents when no dividers are used as in the back cavity of FIG. 7. These figures help to clarify the effect of one divider versus use of two dividers and versus when no dividers are used.

Figure 12:
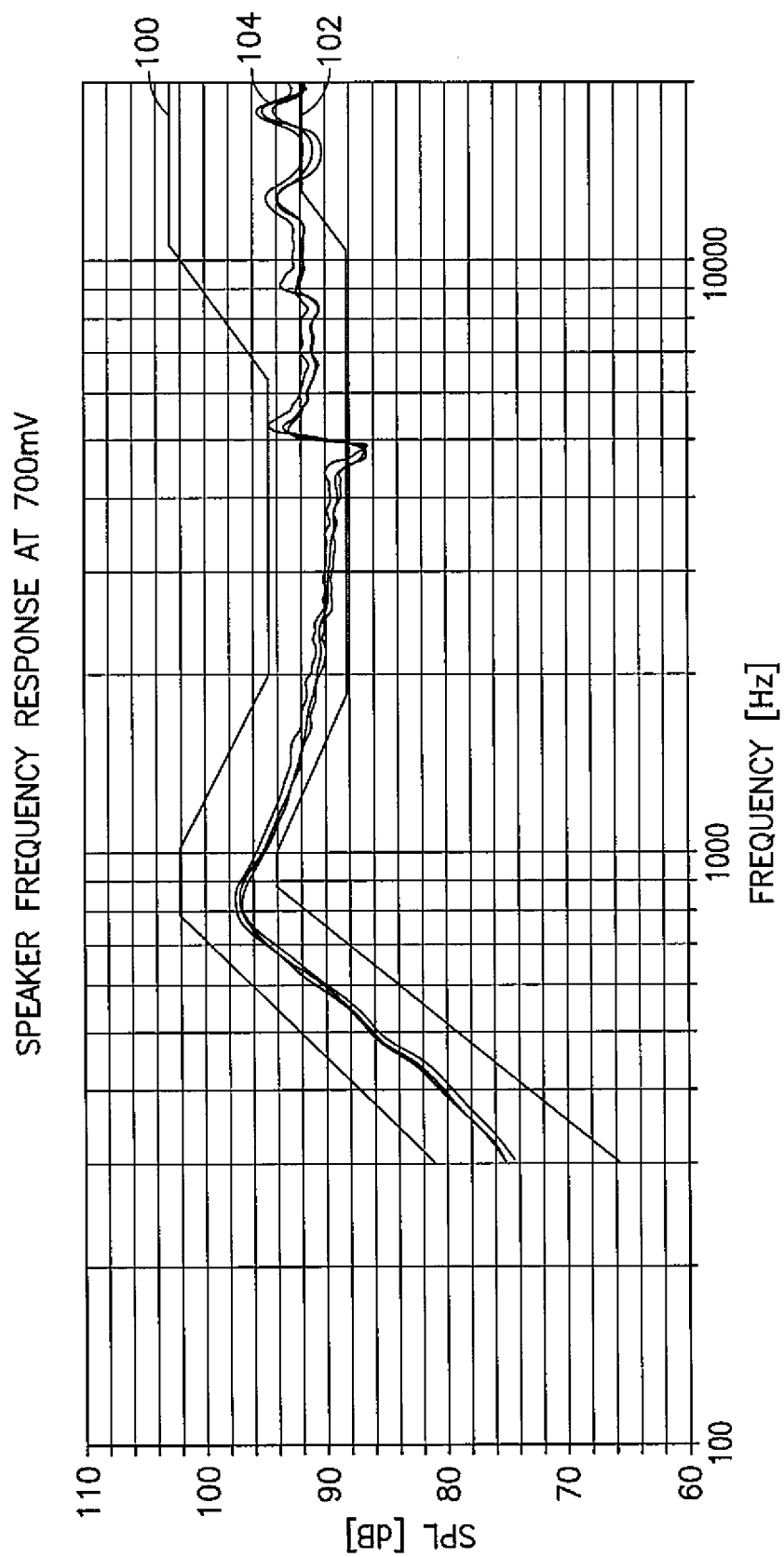
FIG. 12 is a graph illustrating design limits for a speaker and sample speaker frequency responses for a speaker using the housing member shown in FIG. 7.

Referring also to FIG. 12, a speaker will ordinarily be designed to fit within certain upper and lower speaker limits 100, 102 of frequency response. FIG. 12 shows samples of speaker frequency response at 700 mW for using the back cavity shown in FIG. 7 which does not have any dividing structures in the back cavity. As can be seen, some of the frequencies of the samples 104 exceed the limits for the speaker. By exceeding the limits, this results in reduced frequency response, sound quality and perhaps loudspeaker lifetime.

Figure 13:
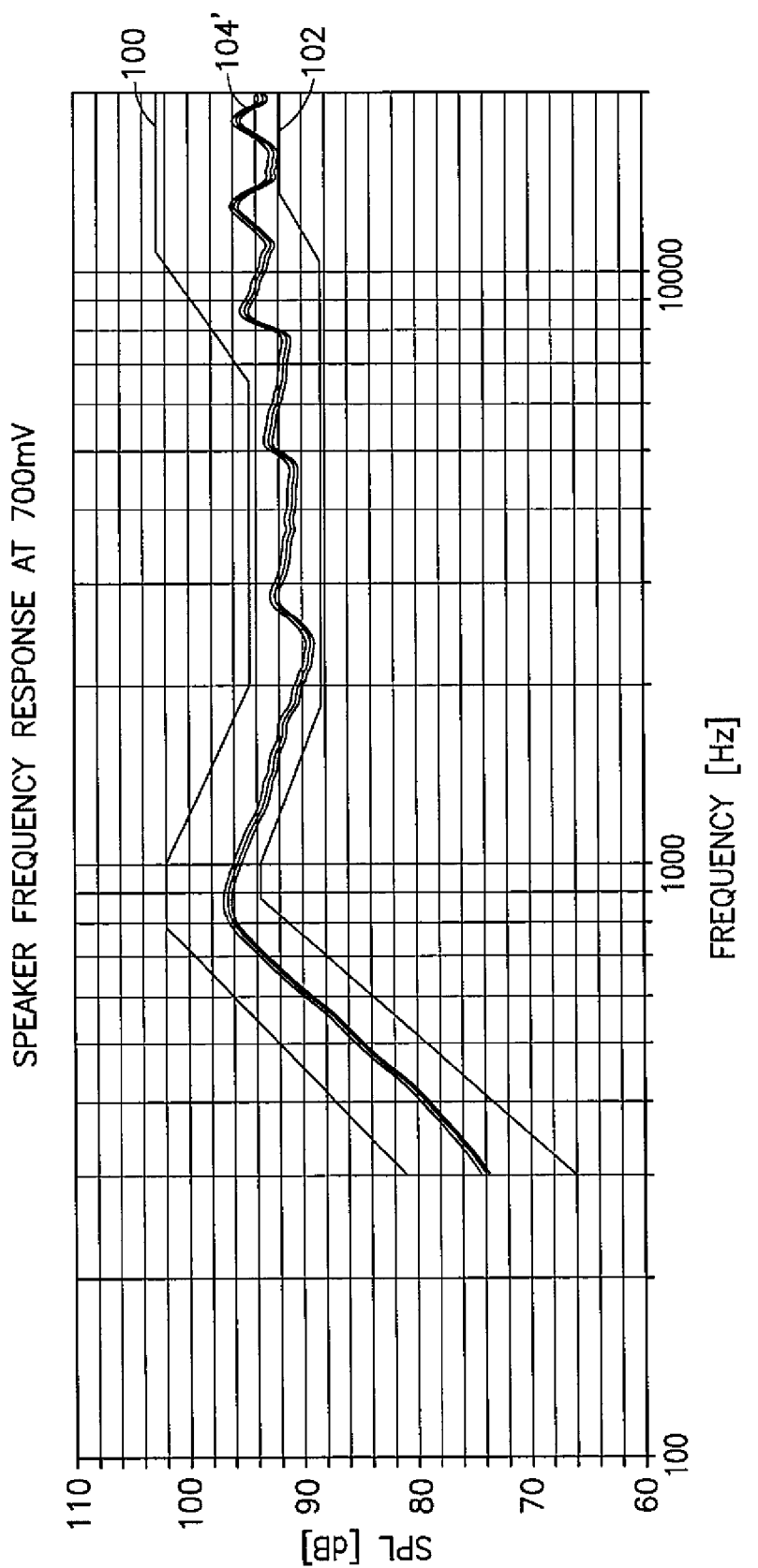
FIG. 13 is a graph similar to FIG. 12 illustrating the design limits and sample speaker frequency responses for a speaker using the housing member shown in FIG. 6.

Referring also to FIG. 13, the same limits are shown for the same speaker, but with use of the back cavity having the dividing structures of FIG. 6. As can be seen, the frequency response of the new samples 104' has been changed to no longer exceed the limits 100, 102. Frequency response has been flattened and shifted from the response with no dividing structures (FIG. 12) versus the response with two dividing structures (FIG. 13). Compare also line 98 (no dividing structures) to line 94 (one dividing structure) to line 96 (two dividing structures).

Features as described herein allow for a compact back cavity having a relatively simple, generally block shape without elongated parts. The overall shape (without the dividing structures) is still too elongated, but rather than having one strong mode, with the addition of the dividing structures provides several weaker modes. Inside the generally block shaped back cavity are one or more dividing structures with aperture(s) which have been tuned to change the frequency response of the speaker.

For audio performance, the back cavity formed by the relatively simple, block shaped cavities 72, 74 provides a compact shape without elongated parts to provide better audio performance than a back cavity having an elongated shape. Without an elongate shaped back cavity, artifacts such as higher modes that result in peaks and dips in the frequency response of the IHF are avoided. Without an elongate shaped back cavity, problematic pronounced peaks and dips, which otherwise would reduce sound quality, are avoided, perceived sound quality is improved, and a likelihood of premature failure is reduced. A dividing structure decouples an outer part of the back cavity from an inner one at higher frequencies and, thus, effectively reduces the cavity size at higher frequencies, meaning that the cavity at higher frequencies effectively becomes more compact.

With features as described herein, the back cavity need not be coupled to ambient air through an acoustic opening(s). Also, the other side of the loudspeaker need not be coupled to the ambient air through acoustic opening(s). In an example embodiment, the back cavity (which is divided by the added constrictions 78, 79) is not coupled to ambient air (except perhaps for a small pressure-equalizing leak that has no appreciable direct effect on the acoustic performance), and only one side of the loudspeaker is coupled to the ambient air.

In an example embodiment, there may be provided a substantially sealed back cavity, acoustically coupled to a speaker component, wherein pre-determined dividing walls (or a tube structure) are able to smooth the frequency response by trying to eliminate the effect of unwanted notches. It could be considered that these dividing structures may be constructed for optimizing a tuned frequency response rather than a tuning of the frequency response based on the cavity, aperture combinations.

An example apparatus 10 may comprise a sound transducer 42; and a housing 12 having the sound transducer connected thereto (or otherwise positioned, integrated, placed, located, provided with the housing), where the housing forms a substantially sealed air space back cavity with the sound transducer, where the housing comprises a one-piece housing member 46 including a first dividing structure 78 or 79 located in the back cavity to separate two adjacent air mass holding sections of the back cavity, where the dividing structure comprises at least one aperture to limit travel of pressure waves through the at least one aperture between the sections.

The housing member may be a one-piece housing member with the first dividing structure integrally formed with the one-piece housing member at a first side of the one-piece housing member, where the two adjacent air mass holding sections are located at the first side of the one-piece housing member. The one-piece housing member may comprise a second dividing structure located in the back cavity to separate two other adjacent air mass holding sections of the back cavity. The first dividing structure may comprise a wall having a plurality of apertures therethrough. The first dividing structure may comprise two spaced elongate walls with an aperture therebetween forming an elongate tuned pipe area. The first dividing structure may comprise an angled elongate wall. A size of the two adjacent air mass holding sections relative to each other may be about 50 percent or greater. Two air mass holding sections of the back cavity may be located in a same plane along a first side 76 of the one-piece housing member. The apparatus may further comprise a printed circuit board 21 connected to a first side of the one-piece housing member to substantially seal the back cavity. The apparatus may further comprise a printed circuit board connected to the sound transducer; at least one processor connected to the printed circuit board; at least one memory connected to the printed circuit board; at least one electronic display connected to the printed circuit board; and at least one battery connected to the printed circuit board. The apparatus may further comprise means for smoothing frequency response of the sound transducer, where the means for smoothing frequency response comprises the first dividing structure.

An example method may comprise providing a sound transducer; connecting a housing member to the sound transducer, where the housing member comprises a wall establishing a perimeter of a back cavity area for the sound transducer, where the wall forms the back cavity area on a single first side of the housing member, where the housing member comprises a first dividing structure located in the back cavity area separating two adjacent air mass holding sections of the back cavity area; and connecting the first side of the housing member to at least one second member to substantially close the back cavity area, where the wall and the first dividing structure attach to the at least one second member to form a substantially sealed air space back cavity with the sound transducer.

The first dividing structure may be integrally formed with the housing member, and where the two adjacent air mass holding sections are located at a same exterior first side of the one-piece housing member. The housing member may comprise a second dividing structure located in the back cavity to separate two other adjacent air mass holding sections of the back cavity, where free ends of the first and second dividing structures are attached to the at least one second member. The first dividing structure may comprise a wall having a plurality of apertures therethrough, where a free end of the wall is attached to the at least one second member. The first dividing structure may comprise two spaced elongate walls with an aperture therebetween forming an elongate tuned pipe area, where free ends of the two walls are attached to the at least one second member. The first dividing structure may comprise an angled elongate wall forming an angled joint between the two air mass holding sections. A size of the two adjacent air mass holding sections relative to each other, after the housing member is attached to the at least one second member, may be about 50 percent or greater. The two air mass holding sections of the back cavity may be located in a same plane along a first side of the housing member, where the first side is attached to the at least one second member. The at least one second member may comprise a printed circuit board connected to a first side of the one-piece housing member to substantially seal the back cavity area.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
    a speaker; and
    a housing member having the speaker connected thereto, where the housing member forms at least part of a back cavity acoustically coupled to the speaker, where the housing member comprises a dividing structure located in the back cavity between two adjacent air mass holding sections of the back cavity, where the dividing structure comprises at least one aperture to permit travel of sound waves through the at least one aperture between the two adjacent air mass holding sections, and where the dividing structure comprises two spaced elongate walls forming an elongate conduit therebetween at least partially forming the at least one aperture.

2. The apparatus as claimed in claim 1 where the housing member is a one-piece housing member having the dividing structure integrally formed with the one-piece housing member at a first side of the one-piece housing member, where the two adjacent air mass holding sections are located at the first side of the one-piece housing member.

3. The apparatus as in claim 1 where the housing member comprises a further dividing structure located in the back cavity to separate two other adjacent air mass holding sections of the back cavity.

4. The apparatus as claimed in claim 1 where at least one of the size, location and shape of the at least one aperture are selected so as to provide a tuning function.

5. The apparatus as claimed in claim 1 where at least one of the elongate walls is angled.

6. The apparatus as claimed in claim 1 where the housing member comprises integrally formed cavities which form at least part of the back cavity.

7. The apparatus as claimed in claim 6 where upstanding walls are provided surrounding the cavities and attached to another component to close the cavity.

8. The apparatus as claimed in claim 1 where the two adjacent air mass holding sections of the back cavity are located in a same plane along a first side of the housing member.

9. The apparatus as claimed in claim 1 further comprising means for smoothing frequency response of the speaker, where the means for smoothing frequency response comprises the dividing structure.

10. The apparatus as claimed in claim 1 further comprising:
    a printed circuit board connected to the speaker;
    at least one processor connected to the printed circuit board; and
    at least one memory connected to the printed circuit board.

11. An electrical device comprising:
    the apparatus as claimed in claim 10;
    at least one electronic display connected to the printed circuit board; and
    at least one battery connected to the printed circuit board.

12. A method comprising:
    providing a speaker;
    connecting a housing member to the speaker, where the housing member forms at least part of a back cavity acoustically coupled to the speaker, where the housing member comprises a dividing structure located in the back cavity between two adjacent air mass sections of the back cavity; and
    where the dividing structure comprises at least one aperture to permit travel of sound waves through the at least one aperture between the two adjacent air mass sections, and where the dividing structure comprises two spaced elongate walls forming an elongate conduit therebetween at least partially forming the at least one aperture.

13. The method as claimed in claim 12 where the dividing structure is integrally formed with the housing member, and where the two adjacent air mass sections are located at a same exterior first side of the housing member.

14. The method as claimed in claim 12 where the housing member comprises a further dividing structure located in the back cavity to connect two other adjacent air mass sections of the back cavity.

15. The method as claimed in claim 12 where at least one of the size, location and shape of the at least one aperture are selected so as to provide a tuning function.

16. The method as claimed in claim 12 where the elongate walls are angled forming an angled joint between the two air mass sections.

17. The method as claimed in claim 12 where the two air mass sections of the back cavity are located in a same plane along a first side of the housing member.

18. An apparatus comprising:
    a sound transducer; and
    a structure having the sound transducer connected thereto, where the structure forms at least part of a back cavity for the sound transducer such that the back cavity forms an air space which is acoustically coupled to the sound transducer for the air space to provide a back cavity functionality for the sound transducer, where the structure comprises a dividing structure in the back cavity, where the dividing structure and at least part of a rest of the structure form, at least partially, two adjacent air mass sections, where the dividing structure is located between the two adjacent air mass sections, where the dividing structure comprises at least one aperture to permit travel of sound waves through the at least one aperture between the two adjacent air mass sections, where the dividing structure comprises a first wall, a second wall and an intermediate gap between the first and second walls forming at least a portion of the at least one aperture as an elongate tuned conduit area between the two adjacent air mass sections.

19. The apparatus as in claim 18 where the dividing structure is part of a one-piece housing member having the dividing structure integrally formed with the one-piece housing member at a first side of the one-piece housing member, where the two adjacent air mass sections are located at the first side of the one-piece housing member.

20. The apparatus as in claim 19 where the one-piece housing member comprises a further dividing structure located in the back cavity to connect two other adjacent air mass sections of the back cavity.

21. The apparatus as in claim 20 where the further dividing structure comprises a dividing wall having a plurality of apertures therethrough.

22. The apparatus as in claim 19 further comprising at least one member connected to the structure to form the back cavity, where the at least one member is connected to ends of walls of the structure along a common plane.

23. The apparatus as in claim 22 where the at least one member comprises a printed circuit board.

24. The apparatus as in claim 18 further comprising:
a printed circuit board connected to the sound transducer;
at least one processor connected to the printed circuit board; and
at least one memory connected to the printed circuit board.

25. An electrical device comprising:
the apparatus as claimed in claim 24;
at least one electronic display connected to the printed circuit board; and
at least one battery connected to the printed circuit board.

26. A method comprising:
providing a sound transducer;
connecting a member to the sound transducer, where the member comprises a wall structure establishing a perimeter of a back cavity area for the sound transducer, where the wall structure is on a single first side of the member, where the member comprises a dividing structure located in the back cavity area connecting two adjacent air mass sections of the back cavity area; and
connecting the wall structure to at least one second member to at least partially close the back cavity area, where the wall structure and the dividing structure attach to the at least one second member to form a back cavity which is acoustically coupled to the sound transducer to provide a back cavity functionality for the sound transducer, where the dividing structure comprises a first wall, a second wall and an intermediate gap between the first and second walls forming an elongate tuned conduit area, where free ends of the first and second walls are attached to the at least one second member.

27. A method as in claim 26 where the at least one second member comprises a printed circuit board connected to the wall structure to at least partially seal the back cavity area.

28. The method as in claim 27 where the dividing structure is integrally formed with the member, and where the two adjacent air mass sections are located at a same exterior first side of the member.

* * * * *